United States Patent [19]
Nagai

[11] Patent Number: 6,135,182
[45] Date of Patent: Oct. 24, 2000

[54] HEAVY DUTY PNEUMATIC RADIAL TIRES WITH ANISOTROPIC BEAD REINFORCING RUBBER

[75] Inventor: Yuichi Nagai, Kodaira, Japan

[73] Assignee: Bridgestone Corporation, Tokyo, Japan

[21] Appl. No.: 09/212,274

[22] Filed: Dec. 16, 1998

[30] Foreign Application Priority Data

Dec. 16, 1997 [JP] Japan .................................. 9-346518

[51] Int. Cl.[7] .............................. B60C 1/00; B60C 15/00; B60C 15/06
[52] U.S. Cl. ......................... 152/458; 152/539; 152/547; 152/564
[58] Field of Search .................................. 152/539, 547, 152/543, 541, 564, 458

[56] References Cited

U.S. PATENT DOCUMENTS 4,711,285  12/1987  Ogawa et al. .

OTHER PUBLICATIONS

Patent Abstracts of Japan, vol. 97, No. 8, Aug. 29,1997; & JPA 09–099708 (BRIDGESTONE CORP) Apr. 15,1997.
Patent Abstracts of Japan, vol. 97, No. 8, Aug. 9,1997; & JPA 09–099709 (BRIDGESTONE CORP) Apr. 15,1997.
Patent Abstracts of Japan, vol. 97, No. 7, Mar. 4,1997; & JPA 09–058228 (BRIDGESTONE CORP) Jul. 31,1997.

*Primary Examiner*—Adrienne C. Johnstone
*Attorney, Agent, or Firm*—Sughrue, Mion, Zinn, Macpeak & Seas, PLLC

[57] ABSTRACT

A heavy duty pneumatic radial tire comprises a carcass ply wound around a bead core from inside toward outside to form a turnup portion, a rubber chafer arranged at an outer surface side of the turnup portion, and a reinforcing rubber arranged between a portion of the rubber chafer and the turnup portion, in which the reinforcing rubber is made of an anisotropic material having different properties at least between the circumferential direction and the radial direction of the tire, and 100% moduli $M_1$, $M_2$ of the reinforcing rubber in the circumferential and radial directions and 100% modulus $M_3$ of a coating rubber for the carcass ply satisfy relationships of $M_1/M_2 > 1.1$ and $M_2/M_3 < 1.0$.

4 Claims, 2 Drawing Sheets

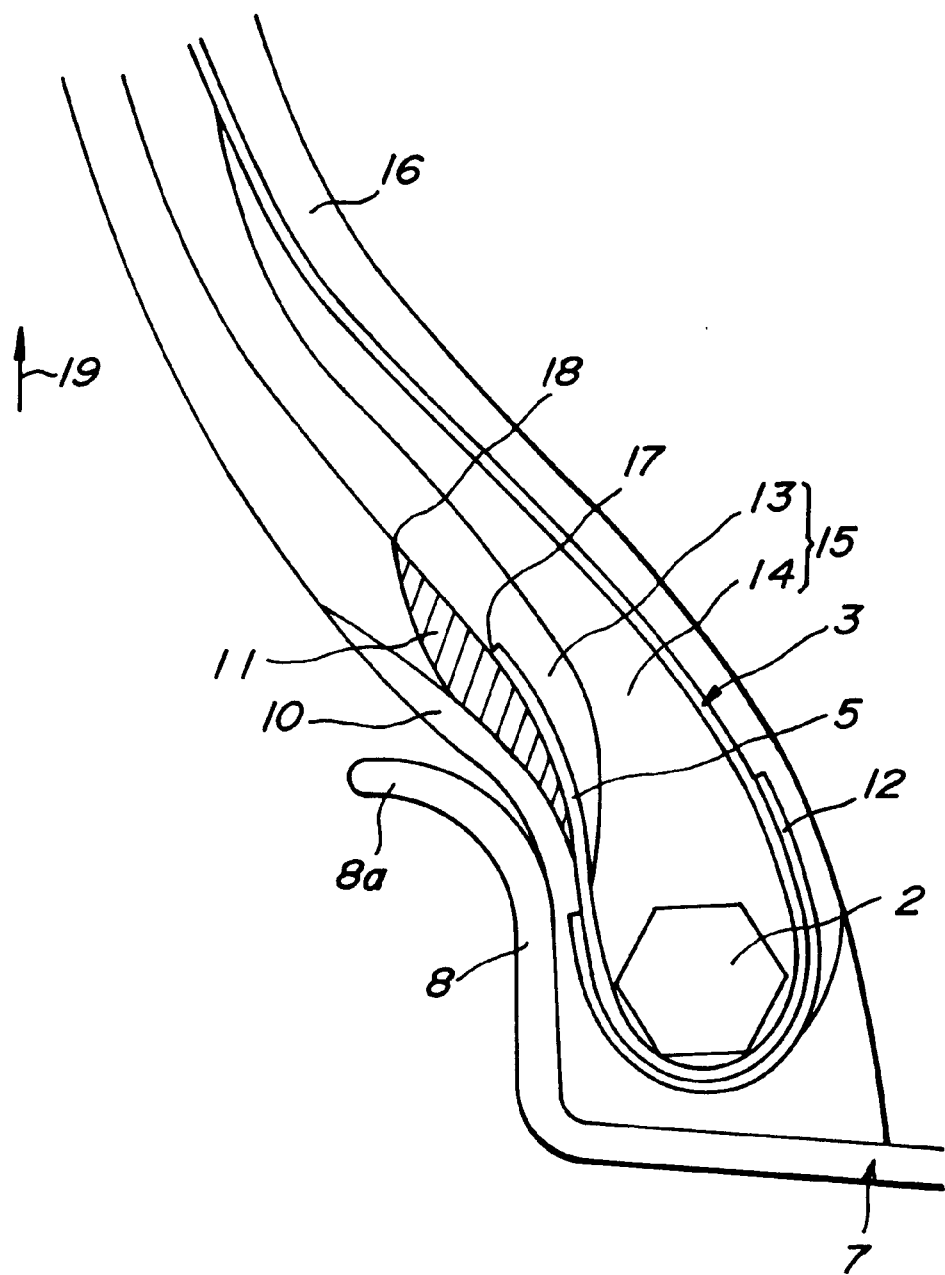

HEAVY DUTY PNEUMATIC RADIAL TIRES WITH ANISOTROPIC BEAD REINFORCING RUBBER

BACKGROUND OF THE INVENTION

1. Field of the Invention

This invention relates to a heavy duty pneumatic radial tire suitable for use in truck, bus, industrial vehicle, construction vehicle and the like. More particularly it relates to a heavy duty pneumatic radial tire having a bead portion durability improved by effectively controlling both a separation failure created in a turnup portion of a radial carcass ply and a wearing and a surface cracking of an outer surface of a bead portion due to friction with a rim flange, which tend to be caused together with repetitive falling-down deformation of the bead portion during the running of the tire under loading.

2. Description of Related Art

As means for improving the bead portion durability in the pneumatic tire, it is useful to arrange a reinforcing member such as a nylon chafer, a wire chafer or the like at an outer peripheral side of a turnup portion of a carcass ply around a bead core, particularly at a side of the turnup portion opposing to that portion of a rim flange which is apt to cause troubles in the bead portion.

However, when plural reinforcing members are arranged for improving tire durability, the increase of weight and the like is caused but also layers resulting in the occurrence of separation failure is newly formed and finally the bead portion durability can not effectively be improved.

As another means for improving the bead portion durability, it is useful to prevent the falling-down deformation of the bead portion in the inflation under an internal pressure or in the loading or control the shearing deformation created in a circumferential direction at a stepping-in or kicking-out side in the loading by modifying the arrangement of rigidity or the like through the rationalization of so-called carcass line. However, the improvement of the bead portion durability only by such a means has a natural limit considering the present state that the service condition of the tire becomes more severer.

When a load is applied to the tire, a side portion of the tire located just under the loading produces a deflection deformation outward in the widthwise direction of the tire and inward in the radial direction thereof, and the falling-down deformation of the bead portion is caused accompanied with such a deformation. The falling-down deformation of the bead portion is caused to rotate about the bead core as a fulcrum, whereby a member sandwiched between the turnup portion of the carcass ply and the rim flange portion (concretely, a reinforcing rubber located between a rubber chafer constituting the outer surface of the bead portion and the turnup portion of the carcass ply) is largely compressed. The compressed member flowingly moves along an upper portion of the rim flange (i.e. toward the outside in the radial direction of the tire), and hence the shearing deformation is repeatedly caused between the compressed member and cords embedded in the turnup portion of the carcass ply during running of the tire under loading. Such a shearing deformation results in the occurrence of the separation failure at an interface between the cord embedded in the turnup portion and an outer rubber (a coating rubber for the carcass ply) or in rubber near the cord.

For example, under a situation that the shearing deformation is repeatedly produced between the turnup portion of the carcass ply and the reinforcing rubber adhered through curing to the outer surface of the turnup portion, in case of the tire adopting so-called low-turnup structure that the turnup end of the carcass ply is located near to the bead portion of the tire, the stress tends to concentrate in the position of the turnup end and the separation failure is apt to be caused at this position.

For this end, in case of the tires for construction vehicle having a large deflection ratio under loading, it is generally known to adopt a so-called high turnup structure that the turnup end of the carcass ply is arranged at a position not subjected to an influence through the falling-down deformation of the bead portion, that is, at a position of the sidewall portion or at a position reaching to the belt. In the tire adopting the above construction, the separation failure at the turnup end of the carcass ply due to the falling-down deformation of the bead portion hardly occurs.

Even in the latter tire, however, there is a tendency of causing the separation failure between the cord embedded in the turnup portion and the outer rubber (coating rubber for carcass ply) accompanied with the shearing deformation in the turnup portion of the carcass ply located at the bead portion of the tire.

SUMMARY OF THE INVENTION

The inventor has made various studies for controlling the separation failure between the cord embedded in the turnup portion of the carcass ply and the coating rubber for the carcass ply, and found that if 100% modulus (tensile stress at 100% elongation) of the reinforcing rubber in the radial direction of the tire is made smaller than 100% modulus of the coating rubber for the turnup portion, the shearing deformation produced at the turnup portion of the carcass ply is small and hence the separation failure can be controlled.

However, when a soft rubber (for example, rubber having a small 100% modulus) is used as the reinforcing rubber, it easily deforms following the deformation of the turnup portion of the carcass ply (for example, the deformation in the radial direction of the tire), so that the separation failure at the turnup portion is controlled. However, the deformation of the reinforcing rubber in the other direction (for example, the deformation in the circumferential direction of the tire) becomes large and also the flow displacement of rubber in the outer surface of the bead portion contacting with an upper part of a rim flange (concretely rubber chafer) in the circumferential direction of the tire is made large accompanied therewith to increase the quantity of the relative movement of the rubber on the outer surface of the bead portion with respect to the upper part of the rim flange. Thus a ratio of the rubber chafer fretting with the upper part of the rim flange increases and hence the rubber chafer is worn or cracks are apt to be created on the surface of the rubber chafer.

On the other hand, when a hard rubber (for example, rubber having a large 100% modulus) is used as the reinforcing rubber, the wearing and surface cracking of the rubber chafer can be controlled. The reinforcing rubber can not flexibly follow to the deformation of the turnup portion and hence a large shearing deformation is caused in the turnup portion to easily create the separation failure.

As a result, in case of the conventional tire using an isotropic material made of either the soft rubber or the hard rubber as the reinforcing rubber, it is difficult to control both the wearing and surface cracking of the rubber chafer and the separation failure at the turnup portion of the carcass ply.

Therefore, the inventor has made further studies for controlling both the wearing and surface cracking of the rubber chafer and the separation failure at the turnup portion of the carcass ply, and found that when an anisotropic material having a small 100% modulus in the radial direction of the tire 25 and a large 100% modulus in the circumferential direction of the tire is used as the reinforcing rubber, both the wearing and surface cracking of the rubber chafer and the separation failure at the turnup portion of the carcass ply can be controlled. It is, therefore, an object of the invention to provide a heavy duty pneumatic radial tire suitable for use in truck, bus, industrial vehicle, construction vehicle and the like having an excellent bead portion durability by using an anisotropic material having different properties at least between the circumferential and radial directions of the tire as a reinforcing rubber adhered through curing to an outer surface of the turnup portion of the carcass ply located in a bead portion and properly setting a ratio of 100% modulus $M_1$ in the circumferential direction to 100% modulus $M_2$ in the radial direction in the reinforcing rubber and a ratio of 100% modulus $M_2$ of the reinforcing rubber to 100% modulus $M_3$ of a coating rubber for the carcass ply to effectively control both the separation failure between the turnup portion of the carcass ply and the reinforcing rubber and the wearing and surface cracking at the outer surface of the bead portion due to friction with the rim flange.

According to the invention, there is the provision of a heavy 15 duty pneumatic radial tire comprising a carcass ply toroidally extending between a pair of bead cores and wound around each bead core from inside of the tire toward outside thereof to form a turnup portion. A rubber chafer is arranged at an outer surface side of the turnup portion and constituting at least an outer surface part of a bead portion opposite to an upper part of a flange of an approved rim at a state of assembling the tire onto the rim. A reinforcing rubber is arranged between a portion of the rubber chafer opposite to the upper part of the rim flange and the turnup portion, in which the reinforcing rubber is made of an anisotropic material having different properties at least between the circumferential direction and the radial direction of the tire, and 100% moduli $M_1$, $M_2$ of the reinforcing rubber in the circumferential and radial directions and 100% modulus $M_3$ satisfy relationships of $M_1/M_2 > 1.1$ and $M_2/M_3 < 1.0$.

The term "an approved rim" used herein concretely means an approved rim defined by "JATMA Year Book (1997)" published by Japanese Automobile Tire Association in Japan. And also, the term "an upper part of the rim flange" used herein concretely means, as shown in FIG. 1, a portion 8a of the rim flange from an end position 20 of the flange to a position 21 of the flange not contacting with a bead portion 1 of the tire at state of applying an air pressure corresponding to a maximum load capacity under no load. Furthermore, the measurement of "100% modulus" is carried out at room temperature according to a method of JIS K6301.

In a preferable embodiment of the invention, the 100% modulus $M_1$ of the reinforcing rubber in the circumferential direction of the tire is within a range of 20–50 kgf/cm², and the 100% modulus $M_2$ of the reinforcing rubber in the radial direction is within a range of 10–30 kgf/cm, and the 100% modulus $M_3$ of the coating rubber for the carcass ply is within a range of 20–50 kgf/cm².

In another preferable embodiment of the invention, the reinforcing rubber is made of a fiber-reinforced rubber material containing short fibers of organic compound oriented substantially in the circumferential direction of the tire.

In the other preferable embodiment of the invention, rubber constituting the rubber chafer has a 100% modulus of 20–70 kgf/cm².

Moreover, a value of a hardness of rubber means a value of a rubber hardness measured by a spring-type testing machine (A type) defined according to JIS K630 1.

BRIEF DESCRIPTION OF THE DRAWINGS

The invention will be described with reference to the accompanying drawings, wherein:

FIG. 2 is a diagrammatically partial section view of a second embodiment of the heavy duty pneumatic radial tire according to the invention.

DESCRIPTION OF THE PREFERRED EMBODIMENTS

Figure 1:
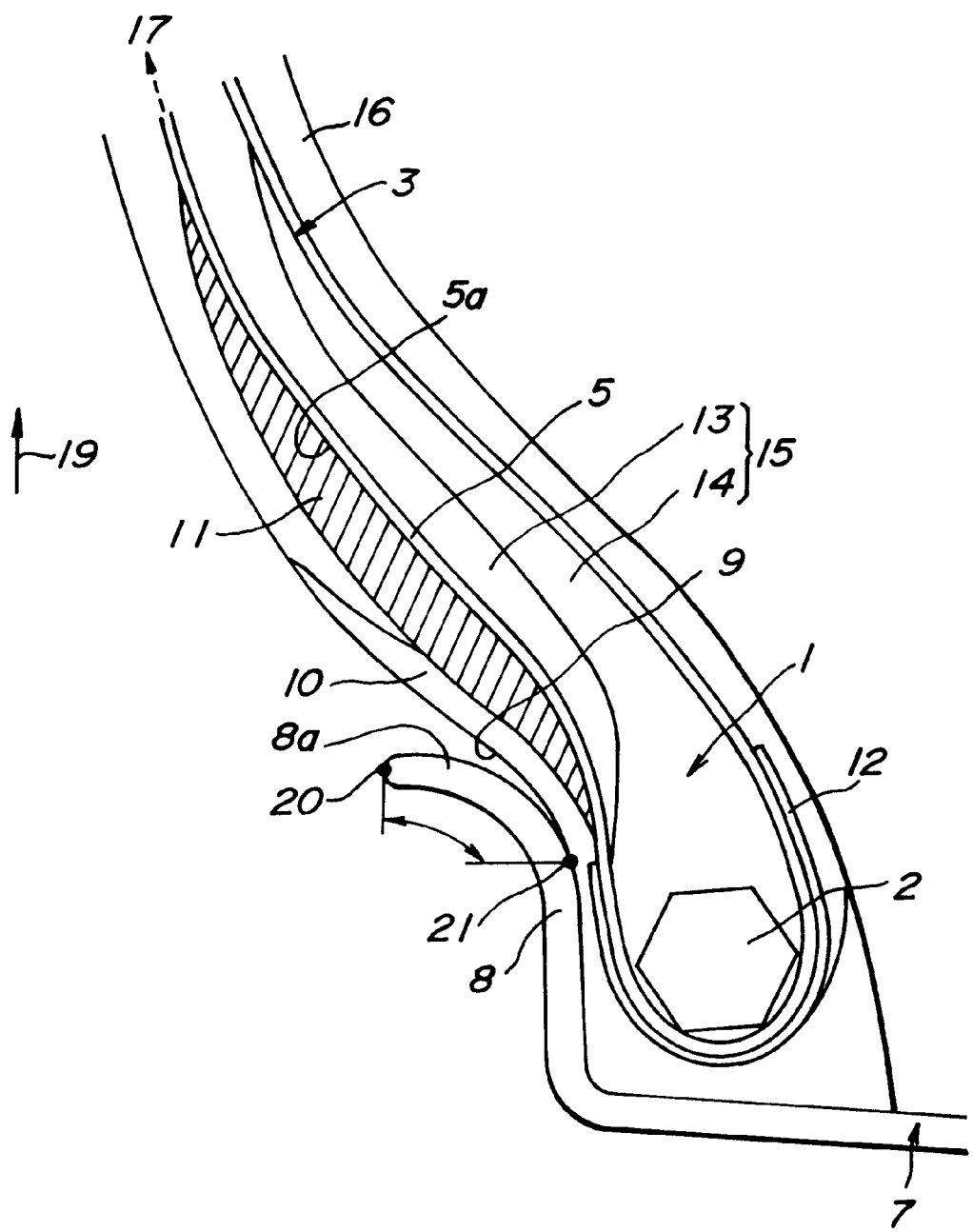
FIG. 1 is a diagrammatically partial section view of a bead portion in a first embodiment of the heavy duty pneumatic radial tire according to the invention.

In FIG. 1 is diagrammatically shown a typical bead portion in a first embodiment of the heavy duty pneumatic radial tire according to the invention at a state of assembling onto a rim, in which numeral 1 is a bead portion, numeral 2 a bead core, numeral 3 a carcass ply, numeral 5 a turnup portion of the carcass ply 3, numeral 7 an approved rim, numeral 8 a flange of the approved rim 7, numeral 10 a rubber chafer, and numeral 11 a reinforcing rubber.

In the tire having the bead portion 1 shown in FIG. 1, the carcass 15 ply 3 is toroidally extended between a pair of the bead cores 2 and wound at its both end portions around each of the bead cores from an inside of a bead filler 15 located just above the bead core toward outside thereof to form the turnup portion 5. Further, a rubber chafer 10 constituting at least an outer surface part of the bead portion 1 opposite to an upper part 8a of a flange 8 of the rim 7 at a state of assembling onto the rim 7 is arranged side an outer surface 5a of the turnup portion 5. Also, the reinforcing rubber 11 is arranged between a portion of the rubber chafer 10 opposite to the upper part 8a of the rim flange 8 and the turnup portion 5 of the carcass ply 3. Since the rubber chafer 10 is enough to constitute at least the outer surface part 9 of the bead portion 1 in the tire, it is not restricted to only a case that the rubber chafer 10 is arranged over a range from the vicinity of the position opposite to the upper part 8a of the rim flange 8 to a position somewhat exceeding a position located just beneath the bead core 2 as shown in FIG. 1. The arranging range may properly be changed, if necessary.

In FIG. 1, a wire chafer 12 is arranged to envelop the bead s core 2 along the outer surface of the carcass ply 3 for reinforcing the bead portion, but the wire chafer 12 may be properly arranged, if necessary. The bead filler 15 shown in FIG. 1 is constituted with two rubbers 13, 14 having different rubber hardnesses, but it is not restricted to such a construction. Moreover, when the rubber filler 15 is constituted with the two kinds of rubbers 13, 14, it is preferable that the rubber 14 located on the side of the bead core 2 is a relatively hard rubber (preferably, a rubber hardness of 60–90) and the rubber 13 located on the side of a sidewall portion is a relatively soft rubber (preferably, a rubber hardness of 50–70).

The invention lies in the use of an anisotropic material having 15 properties different at least between the circumferential direction and the radial direction of the tire as the reinforcing rubber 11. Concretely, the reinforcing rubber 11 has the following properties. That is, a 100% modulus $M_2$ (preferably, 10–30 kgf/cm²) of the reinforcing rubber 11 in the radial direction of the tire is smaller than a 100% modulus $M_3$ (preferably 20 20–50 kgf/cm²) of a coating rubber for the carcass ply 3 (particularly the turnup portion 5) (concretely $M_2/M_3<1.0$). A 100% modulus $M_1$ (preferably, 20–50 kgf/cm$^2$) of the reinforcing rubber in the circumferential direction of the tire is larger than the 100% modulus $M_2$ of the reinforcing rubber in the radial direction thereof (concretely, $M_1/M_2>1.1$).

When the 100% modulus $M_2$ of the reinforcing rubber 11 in the radial direction of the tire is smaller than the 100% modulus $M_3$ of the coating rubber for the turnup portion 5 of the carcass ply ($M_2/M_3<1.0$, preferably $M_2/M_3<0.65$), the reinforcing rubber sandwiched and compressed between the turnup portion of the carcass ply and the rim flange portion through the falling-down deformation of the bead portion can flexibly and flowingly be moved along the upper part of the rim flange (that is, outward in the radial direction of the tire). As a result, the s shearing deformation can be absorbed and cut off to effectively control the separation failure at the turnup portion of the carcass ply.

If the 100% modulus $M_2$ of the reinforcing rubber 11 in the radial direction of the tire is equal to or larger than the 100% modulus $M_3$ of the coating rubber for the turnup portion 5, the shearing deformation at the turnup portion can not effectively be absorbed and cut off. In the invention, therefore, a ratio $M_2/M_3$ of the 100% modulus $M_2$ of the reinforcing rubber 11 in the radial direction of the tire to the 100% modulus $M_3$ of the coating rubber for the turnup portion 5 of the carcass ply is limited to less than 1.0.

In the invention, however, it is not yet sufficient to limit only ratio $M_2/M_3$ of the 100% modulus $M_2$ of the reinforcing rubber 11 to the 100% modulus $M_3$ of the coating rubber for the turnup portion 5 to less than 1.0.

Namely, when an isotropic material made of a soft rubber having 20 a small 100% modulus $M_2$ is used, for example, as the reinforcing rubber 11 in order to provide the ratio $M_2/M_3$ of less than 1.0, the deformation of the reinforcing rubber in the other direction (for example, the deformation in the circumferential direction of the tire) becomes larger and the flow-displacement of rubber at the outer surface of the bead portion contacting with the upper part of the rim flange (concretely, the rubber chafer) in the circumferential direction of the tire becomes larger accompanied therewith to increase the quantity of relative movement of rubber at the outer surface of the bead portion with respect to the upper part of the rim flange. Thus, a ratio of fretting the rubber chafer with the upper part of the rim flange is increased and it is apt to easily cause the wearing or surface cracking of the rubber chafer.

In the invention, therefore, it is a further essential feature that s the 100% modulus $M_1$ of the reinforcing rubber 11 in the circumferential direction of the tire is made larger than the 100% modulus $M_2$ of the reinforcing rubber in the radial direction, concretely the ratio $M_1/M_2$ is made lager than 1.1.

By making the ratio $M_1/M_2$ larger than 1.1 (preferably, $M_1/M_210>1.5$), the flow displacement of the reinforcing rubber 11 in the circumferential direction of the tire is relatively decreased to enhance the rigidity against the shearing force in the circumferential direction, whereby strain can be decreased. Moreover, the reason why the ratio $M_1/M_2$ is made larger than is 1.1 is due to the fact that when the ratio $M_1/M_2$ is not more than 1.1, the rigidity against the shearing force in the circumferential direction can not sufficiently be enhanced and it is apt to easily cause the wearing and surface cracking of the rubber chafer.

As seen from the above, according to the invention, a new 20 construction that an anisotropic material satisfying relationships of $M_2/M_3<0$ and $M_1/M_2>1.1$ is used as the reinforcing rubber is adopted. Consequently, this invention first succeeded to establish the control for both the separation failure between the turnup portion of the carcass ply and the reinforcing rubber and the wearing and surface cracking of the rubber chafer.

The anisotropic material used in the reinforcing rubber is preferable to be produced by an extrusion molding method, concretely by extruding a rubber layer compounded with a proper amount of short fibers made of an organic compound such as nylon, polyethylene tereplithalate (PET) or the like to orient these short fibers in an extrusion direction (the rubber layer is arranged to meet the extrusion direction with the circumferential direction of the tire in the tire building), but the production of the anisotropic material is not limited to this method. For example, it may be produced by compounding syndiotactic-1,2-polybutadiene having a crystallinity.

When the short fibers are used in the production of the anisotropic material, it is preferable that the short fiber (e.g. nylon fiber) has a diameter of 0.1–1.0 μm and a ratio of length to diameter of 100–500.

If it is required to more effectively control the wearing and surface cracking of the rubber chafer 10, it is preferable that 100% modulus of rubber constituting the rubber chafer 10 is within a range of 20–70 kgf/cm$^2$.

Although the above is described with respect to only a preferred 15 embodiment of the invention, various modifications may be taken within the scope of the invention.

For example, FIG. 1 shows a case that a turnup end 17 of the carcass ply is located outward (19) from the bead portion 1 in the radial direction of the tire. However, as shown in FIG. 2, the turnup end 17 may be located in the bead portion 1. In the latter case, it is necessary that an outer end 18 of the reinforcing rubber 11 in the radial direction of the tire is located outward from the turnup end 17 in the radial direction of the tire in order to control the separation failure at the turnup end 17.

The following examples are given in illustration of the invention 25 and are not intended as limitations thereof.

A heavy duty pneumatic radial tire for construction vehicle according to the invention is prepared and subjected to a test for evaluating the bead portion durability as mentioned below.

Invention tires of Examples 1 and 2 have a tire size of 37.00 R57 and a section of a bead portion shown in FIG. 1, in which 100% moduli $M_1$ and $M_2$ of a reinforcing rubber in the circumferential and radial directions of the tire, 100% modulus $M_3$ of a coating rubber for a carcass ply 3 and ratios $M_1/M_2$ and $M_2/M_3$ are summarized in Table 1.

TABLE 1

| | Reinforcing rubber | | Coating rubber for carcass ply | | | Evaluation of tire properties | |
|---|---|---|---|---|---|---|---|
| | 100% modulus $M_1$*1 (kgf/cm²) | 100% modulus $M_2$*2 (kgf/cm²) | 100% modulus $M_3$ (kgf/cm²) | $M_1/M_2$ | $M_2M_3$ | Bead portion durability A*3 | Bead portion durability B*4 |
| Comparative Example 1 | 26 | 26 | 35 | 1.00 | 0.74 | Δ | Δ |
| Comparative Example 2 | 16 | 16 | 35 | 1.00 | 0.46 | ⊚ | X |
| Comparative Example 3 | 46 | 46 | 35 | 1.00 | 1.31 | X | ⊚ |
| Comparative Example 4 | 28 | 26 | 35 | 1.07 | 0.86 | Δ | Δ |
| Example 1 | 46 | 16 | 35 | 2.87 | 0.46 | ⊚ | ⊚ |
| Example 2 | 35 | 22 | 35 | 1.75 | 0.63 | ○ | ○ |

*1 100% modulus in the circumferential direction
*2 100% modulus in the radial direction
*3 Evaluation by a crack length of the separation failure at an outer surface of the turnup portion of the carcass ply (coating rubber for carcass ply)
*4 Evaluation by a maximum length (mm) of the crack created at the outer surface of the bead portion (rubber chafer) opposite to the rim flange portion Moreover, the carcass ply 3 is a single rubberized steel cord ply, and a belt is comprised of six rubberized steel cord layers, cords of which layers are crossed with each other. And also, a wire chafer 12 is disposed to envelop a bead core 2 along an outer surface of the carcass ply 3 for s reinforcing the bead portion. A bead filler 15 is comprised of two rubbers 13, 14 having different hardnesses, in which the hardness of the rubber 14 located at a side of the bead core 2 is 68 and the hardness of the rubber 13 located at a side of the sidewall portion is 60. Rubber constituting a rubber chafer 10 has 100% modulus of 35 kgf/cm². The reinforcing 10 rubber 11 is composed of a fiber-reinforced rubber material containing nylon short fibers of 0.1 pm in diameter and 25 pm in length oriented in the circumferential direction of the tire. A compounding recipe of the fiber-reinforced rubber material is shown in Table 2.

TABLE 2

| Compounding recipe of reinforcing rubber | |
|---|---|
| Natural rubber | 100 parts by weight |
| Carbon black | 40 parts by weight |
| ZnO | 4.0 parts by weight |
| Sulfur | 2.2 parts by weight |
| Nylon short fiber | 5.0 parts by weight |

[Evaluation of bead portion durability]

A test for evaluating the bead portion durability is performed on a rotating drum with respect to each of the tires assembled onto a standard rim defined by JATMA. In this case, after the tread portion of the tire is previously peeled to make thin the rubber thickness thereof, the tire is run on the drum at a speed of 10 kmlh (constant speed) under an internal pressure of 700 kPa, during which a load applied to the tire is gradually increased from 51.5 ton step by step. When tire trouble is caused in Lu Comparative Example 1, the test for all tires is stopped. Thereafter, each of the tires is scraped to observe the trouble condition of the bead portion, whereby the bead portion durability is evaluated from a degree of separation failure between the reinforcing rubber and the turnup portion and a value measured on a total length of surface crack created in the outer surface of the bead portion (that is, the surface of the rubber chafer). The evaluation results are also shown in Table 1.

In Table 1, the bead portion durability A indicates the degree of separation failure created at the turnup portion of the carcass ply, in which "⊚" means that the separation failure is not caused, "○" means that the separation failure is slight (less than 10 mm), "Δ" means that the crack length in the separation failure is within a range of 10 mm to 50 mm, and "x" means that the crack length in the separation failure is more than 50 mm. In the invention, "⊚" and "○" are acceptable level.

Furthermore, the bead portion durability B indicates an evaluation for the measured value of maximum length (mm) on the circumference of the surface crack created in the surface of the rubber chafer, in which "⊚" means that the surface crack is not caused, "○" means that the surface crack is slight (less than 40 mm), "Δ" means that the maximum length of the surface crack is within a range of 40 mm to 75 mm, and "x" means that the total length of the surface crack is more than 75 mm. In the invention, "⊚" and "○" are acceptable level.

As seen from the results of Table 1, in Comparative Example 1–4, either the bead portion durability A or B is worse than the acceptable level, while in Example 1 and 2, both the bead portion durabilities A and B satisfy the acceptable level.

According to the invention, it is possible to provide heavy duty pneumatic radial tires suitable for use in truck, bus, industrial vehicle, construction vehicle and the like having an excellent bead portion durability by effectively controlling both the separation failure at the turnup portion of the carcass ply located in the bead portion and the wearing and surface cracking on the outer surface of the bead portion due to the friction with the rim flange.

What is claimed is:

1. A heavy duty pneumatic radial tire comprising; a carcass ply toroidally extending between a pair of bead cores and wound around each bead core from inside of the tire toward outside thereof to form a turnup portion, a rubber chafer arranged at an outer surface side of the turnup portion and constituting at least an outer surface part of a bead portion opposite to an upper part of a flange of an approved rim at a state of assembling the tire onto the rim, and a reinforcing rubber arranged between a portion of the rubber chafer opposite to the upper part of the rim flange and the turnup portion, in which the reinforcing rubber is made of an anisotropic material having different properties at least between the circumferential direction and the radial direction of the tire, and 100% moduli $M_1$, $M_2$ of the reinforcing rubber in the circumferential and radial directions and 100% modulus $M_3$ of a coating rubber for the carcass ply satisfy relationships of $M_1/M_2>1.1$ and $M_2/M_3<1.0$.

2. A heavy duty pneumatic radial tire according to claim 1, wherein the 100% modulus $M_1$ of the reinforcing rubber in the circumferential direction of the tire is within a range of 20–50 kgf/cm², the 100% modulus $M_2$ of the reinforcing rubber in the radial direction is within a range of 10–30 kgf/cm², and the 100% modulus $M_3$ of the coating rubber of the carcass ply is within a range of 20–50 kgf/cm².

3. A heavy duty pneumatic radial tire according to claim 1, wherein the reinforcing rubber is made of a fiber-reinforced rubber material containing short fibers of an organic compound which are oriented substantially in the circumferential direction of the tire.

4. A heavy duty pneumatic radial tire according to claim 1, wherein the rubber constituting the rubber chafer has a 100% modulus of 20–70 kgf/cm².

* * * * *